United States Patent

[11] 3,631,350

[72] Inventor John Vernon Drake
 Plano, Tex.
[21] Appl. No. 72,468
[22] Filed Sept. 15, 1970
[45] Patented Dec. 28, 1971
[73] Assignee Collins Radio Company
 Dallas, Tex.

[54] SYNCHRONOUS COUNTING APPARATUS
 1 Claim, 5 Drawing Figs.
[52] U.S. Cl. ........................................ 328/42,
 307/218
[51] Int. Cl. ........................................ H03k 21/30
[50] Field of Search ............................ 307/224,
 218; 328/42

[56] References Cited
 UNITED STATES PATENTS
 2,853,238 9/1958 Johnson ........................ 328/42 X
 3,345,574 10/1967 Hilberg ......................... 328/42 X
 3,458,825 7/1969 Lagemann .................... 328/206
 3,548,319 12/1970 Price ............................ 328/41

*Primary Examiner*—John S. Heyman
*Attorneys*—Robert J. Crawford and Bruce C. Lutz ABSTRACT: Apparatus for and the method of obtaining high-speed synchronous counting at speeds and an accuracy which would normally encounter problems due to delays in steering circuits used with the counting flip-flops. This is accomplished by the use of a synchronous AND gate operating in conjunction with a first section of flip-flops for controlling the remaining section of flip-flops.

INVENTOR.
JOHN VERNON DRAKE
BY Bruce C Lutz
ATTORNEY

SYNCHRONOUS COUNTING APPARATUS

The present invention is generally related to electronics and more specifically related to counting apparatus. Even more specifically, the present invention is directed toward synchronous counting apparatus.

As is well known to those skilled in the art, a synchronous counter is distinguishable from other types of counters in that every flip-flop in the counter, whose output is representative of a count, changes substantially simultaneously immediately after a particular clock edge. Propagation counters are the fastest type of counters but propagation counter outputs lag the clock input and this lag is variable. If only a single count were desired from a counter, this variable lag could be taken into account in obtaining a count indication. However, if a plurality of counts are to be obtained from the counter, the various delay considerations which need to be taken into account to determine the actual clock input becomes so complicated that the use of such a counter is precluded. A synchronous counter on the other hand provides an accurate instantaneous count of the clock at all times.

The prior art has many examples of counting circuits and also has synchronous counting circuits. However, as the counting speeds are increased, the delays of steering circuits are such that the counter can not exceed a predetermined number of stages. This can be remedied by using flip-flops which incorporate a larger number of ANDed inputs but this is often impractical.

The present invention solves the steering circuit delay problem of a high-speed synchronous counter by utilizing a "synchronous AND gate" in conjunction with the multiple input flip-flops to obtain a synchronously operated counter.

It is therefore an object of the present invention to provide an improved synchronous counting circuit.

Other objects and advantages of the present invention will be apparent from a reading of the specification and claims in conjunction with the drawings wherein:

Figure 1:
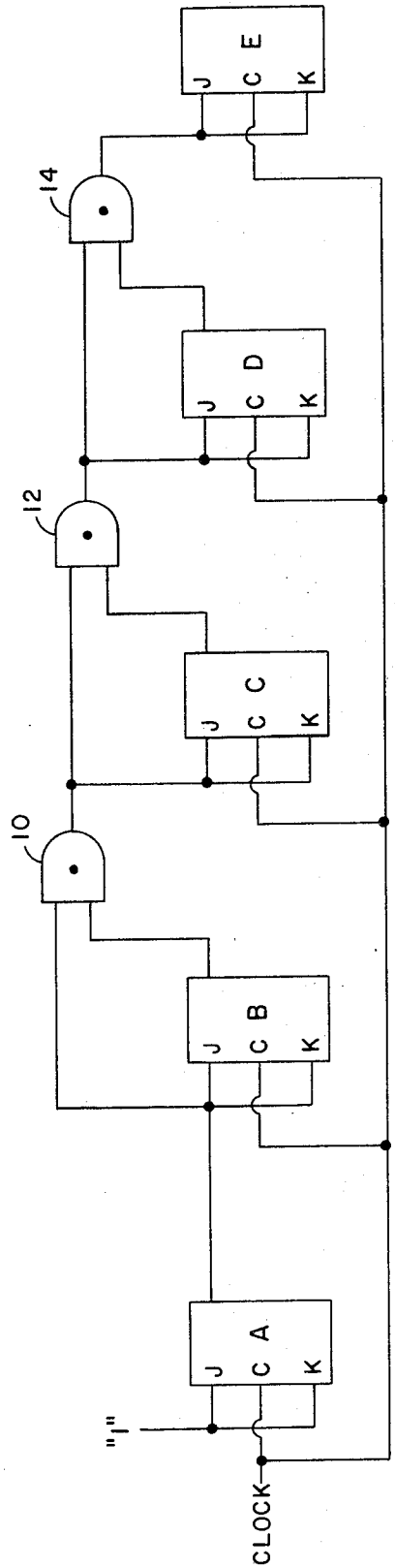
FIG. 1 is a schematic block diagram of an idealized synchronous counter.
Figure 5:
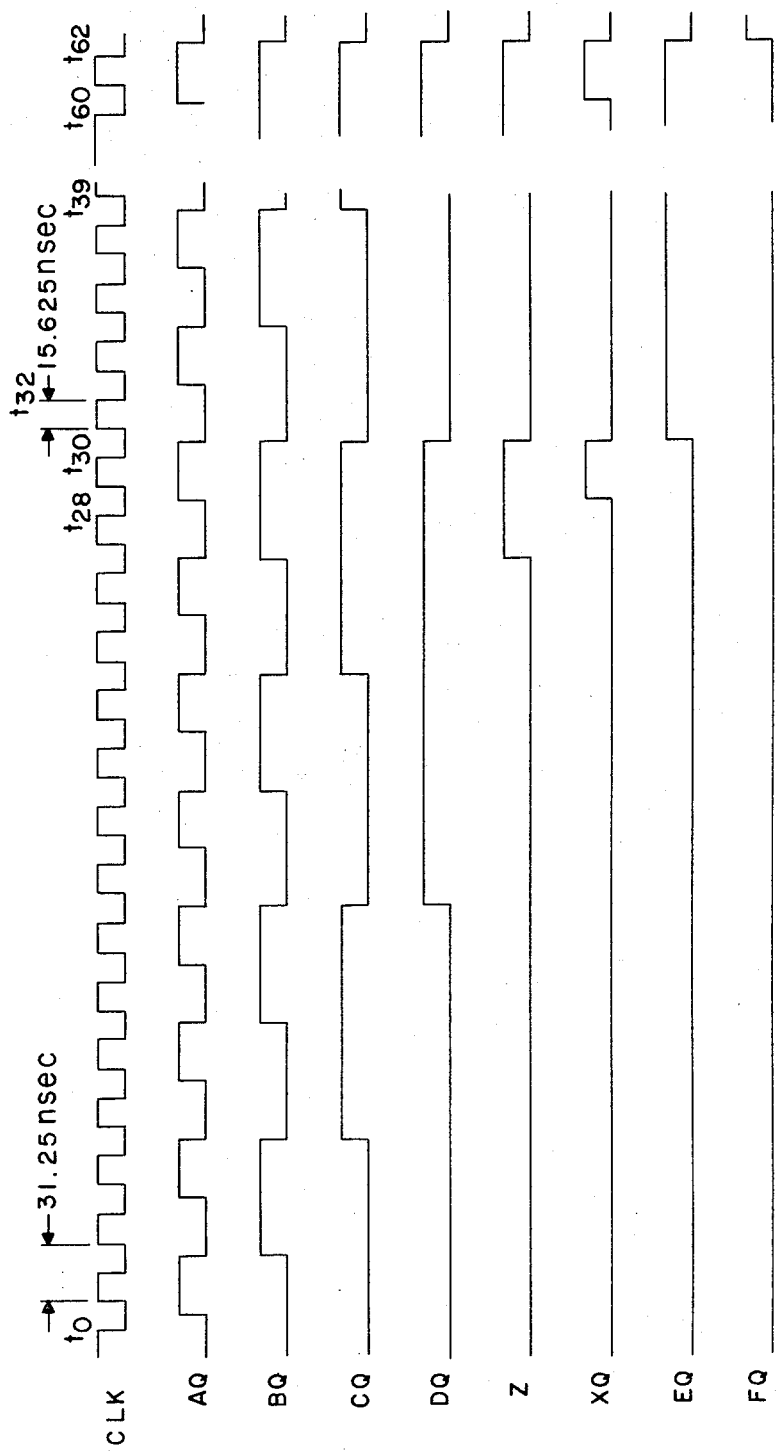
FIG. 5 is a set of waveforms for use in explaining FIG. 4.

In FIG. 1 a plurality of J-K flip-flops from A to E are shown, each having a single input for each of the J and K inputs rather than the ANDed inputs as shown in the later figures. A plurality of idealized instantaneously acting AND-gates 10, 12, and 14 are shown each having its output connected to both the J and K inputs of the following stage while the inputs of each AND gate are connected to the input and output of the flip-flop of the previous stage. The waveforms of FIG. 5 are applicable in part to an explanation of the operation of FIG. 1. Since both the J and K inputs of flip-flop A are always at a logic-one voltage level, the clock input will change the output of flip-flop A on each negative-going portion thereof. The waveforms of FIG. 5 are drawn with the presumption that the J-K flip-flop requires approximately 10 nanoseconds to react. This same assumption may be used in FIG. 1. As will be observed, the output of flip-flop A changes immediately after each negative-going clock input. This output is labeled AQ in FIG. 5.

The flip-flop B will operate only when the output of flip-flop A is positive and a negative-going clock is received. Thus, flip-flop B will operate only every other time a negative-going clock is provided. Since it was assumed that each of the ideal AND gates of FIG. 1 operate instantaneously (and such is never the case) flip-flop C will operate every fourth negative-going pulse.

In applying the waveforms of FIG. 5 to FIG. 1, the waveforms Z, XQ, and FQ may be ignored. The waveforms shown are not quite a full cycle of the E waveform as only 32 clocks are shown with the cycle broken between time T-39 and T-60 to provide adequate room for illustrative purposes.

Figure 2:
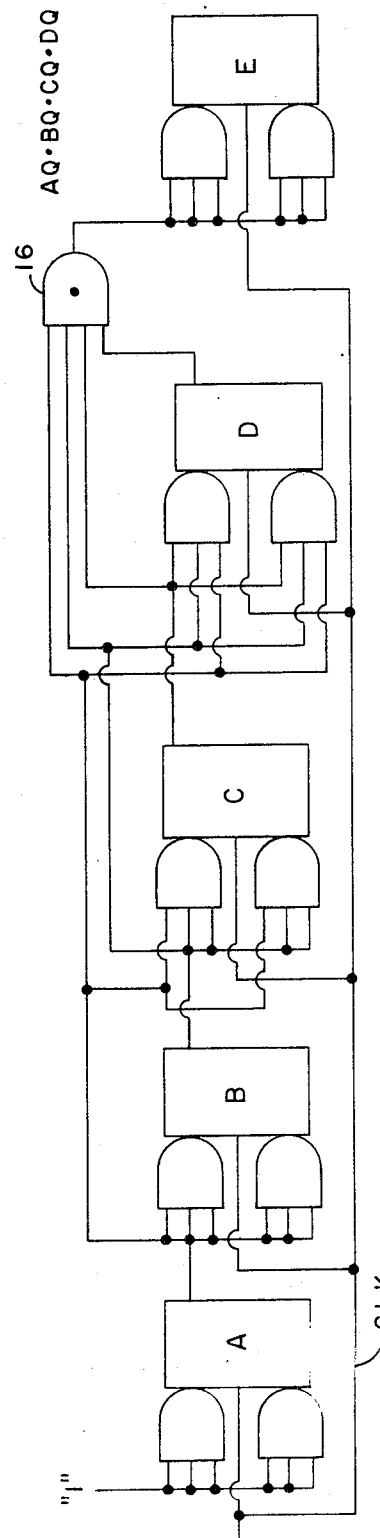
FIG. 2 is a block diagram of a prior art method of producing a synchronous counter when the number of stages exceeds the available inputs on a flip-flop.
Figure 3:
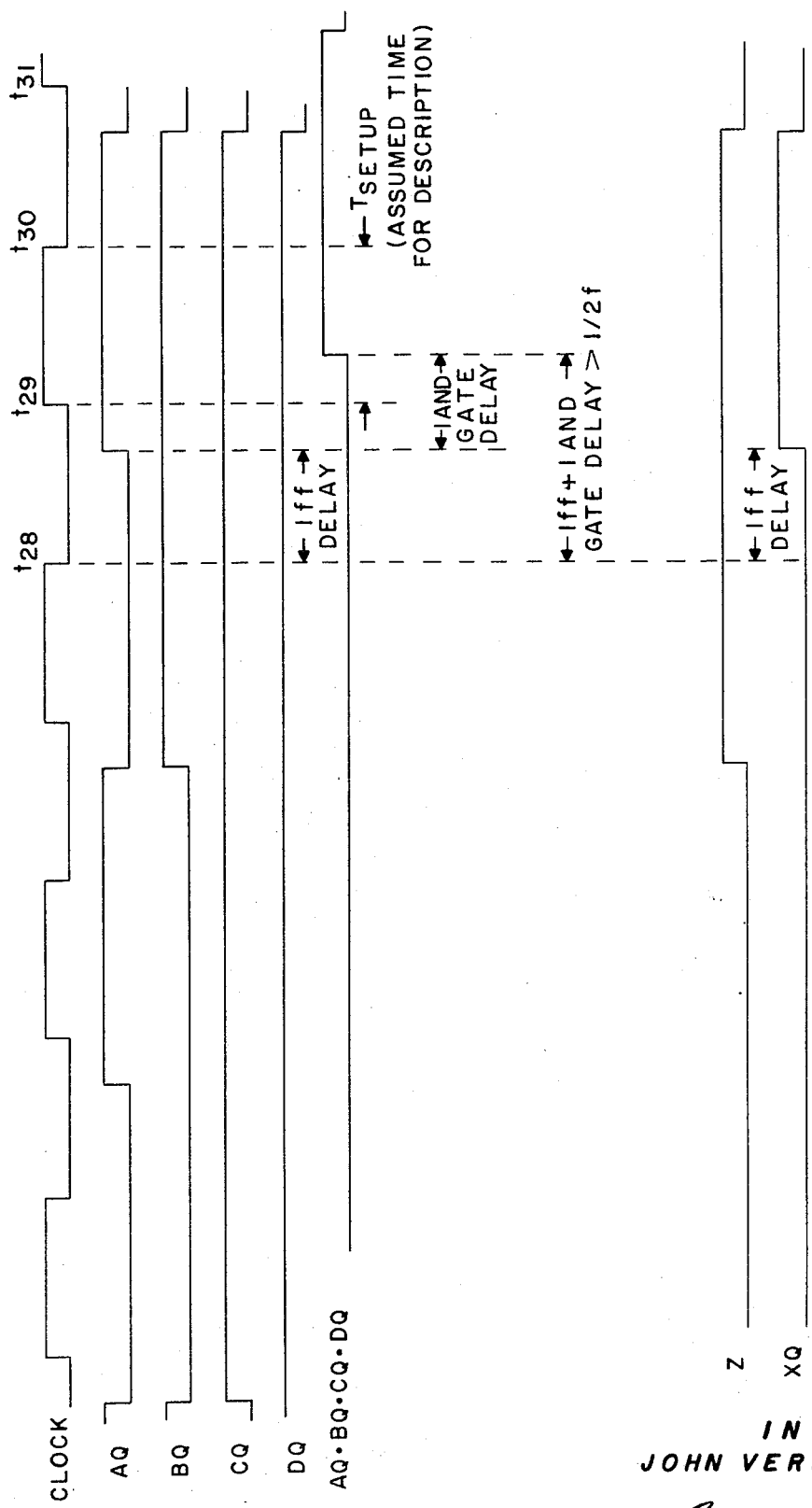
FIG. 3 is a set of waveforms for use in explaining both FIG. 2 and FIG. 4.

As previously indicated, FIG. 2 is illustrative of the prior art. The waveforms in FIG. 3 provide an expanded view of the waveforms of FIG. 5 around time periods T-28 to T-31. The upper waveforms of FIG. 3 are applicable to FIG. 2. As shown, FIG. 2 utilizes a plurality of J-K flip-flops each having a clock input and wherein each of the J and K inputs is designed having a three-input AND gate. Three terminal ANDed input J-K flip-flops are a normal production item by several producers. Thus, as previously indicated in conjunction with FIG. 1, each clock input to flip-flop A will alter the output as shown in the waveforms of FIG. 5 and every other negative-going clock input will alter the output of flip-flop B. Since each J-K flip-flop only has three inputs, at stage D there are too many preceding inputs to be applied to stage E. In this event a steering AND gate, shown as 16, is utilized with the outputs of the previous four stages. These outputs are all ANDed and supplied as a steering signal or pulse to the J and K inputs of flip-flop E. This will operate as long as the total delay of the flip-flops and the AND gate is less than the reciprocal of the clock frequency minus the setup time:

$$(1/f) - T \text{ setup.}$$

Since a symmetrical clock has been assumed, and further since a flip-flop will provide unreliable operation if it does not have the proper setup time with a positive input to the flip-flops before application of the negative-going clock pulse, it will be observed from the waveforms of FIG. 3 that unreliable operation will be obtained from the output of stage E in FIG. 2. As shown, the output from AND-gate 16 did not become positive until after time T-29 due to the delay inherent in gate 16.

Thus, the circuit of FIG. 2 will not operate reliably wherever the total number of stages is such that an auxiliary steering circuit such as gate 16 is required to compensate for the lack of sufficient number of ANDed inputs on remaining stages of the synchronous counter and where the total propagation time delays of the flip-flops and the steering gate exceed $$(1/f) - t \text{ setup.}$$

Figure 4:
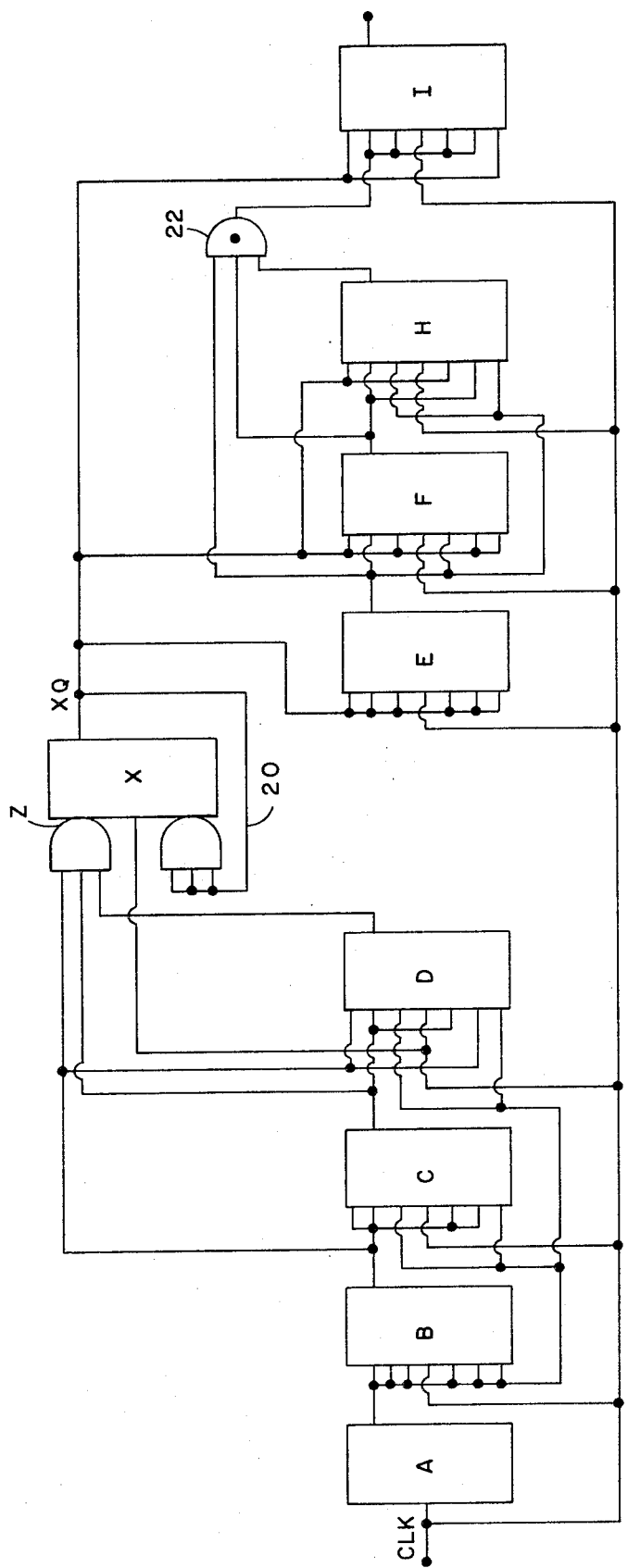
FIG. 4 is a schematic diagram of one embodiment of the invention.

The circuitry of FIG. 4 has been simplified to provide a clearer illustration of the circuit, and the AND inputs of the J-K flip-flops A-I have not been illustrated. However, the AND inputs of flip-flop X have been shown. However, the upper inputs to these flip-flops, namely those above the clock input, are the J-inputs; and those below the clock input are the K-inputs and these are all ANDed in the same manner as indicated in FIG. 2. Further, although each input of the ANDed input terminals for flip-flop A must be connected to a positive source for the flip-flop to operate satisfactorily, this has not been shown since the detail of such a connection is shown in FIG. 2. Thus, it will be assumed that flip-flop A is connected to a positive potential source in the same manner as shown in FIG. 2.

Referring now to FIG. 5 it will be observed that waveforms are not shown for all the stages of FIG. 4 but this is not believed necessary. Further, a waveform Z is shown which would be illustrative of the ANDed input within the J-K flip-flop X at the junction of the J-inputs. The waveform XQ is of course the output from the X flip-flop stage. This XQ-output is supplied on lead 20 back to the K-inputs of flip-flop X. Thus, when all the inputs at the J-terminal of X are positive, the output will change upon the occurrence of the next negative-going clock as shown in FIG. 5 immediately after time T-28 which is a negative-going clock pulse. This will set the K-inputs to a positive value so that upon the next occurrence of a negative-going clock shown at time T-30, the flip-flop will again change its state. Due to the connections, all the inputs at the J-terminal of X will not be positive until time T-60. As will be noted from the waveforms, the output of the flip-flop X coincides with the output of the A flip-flop between time period T-28 and T-31. As also will be noted, this output is representative of the logical ANDing of the outputs of stages A, B, C, and D even though the input to the X flip-flop is not connected directly to the A flip-flop. Thus, the flip-flop X represents a synchronous AND gate for all the flip-flop stages in the first section of the FIG. 4 counter.

The circuit of FIG. 4 will operate exactly as FIG. 2 until time period T–28. At this time a positive output will appear as shown by output XQ which supplies the appropriate inputs to flip-flop E. Flip-flop E then alters its state immediately after the negative-going pulse at time T–30. Flip-flop E again changes its output immediately after time T–62 which is the next occurrence of an output from synchronous AND-gate X. Although not shown on the waveforms of FIG. 5, the three stages E, F, and H will supply their outputs to an AND-gate 22 so that stage I receives the combined outputs of the previous stages E, F, and H along with the XQ-output representative of the logical ANDing of the first four stages. The delays of AND-circuit 22 are not sufficient to cause problems since each of these inputs is set long before the occurrence of the output XQ to trigger stage I. This can be readily ascertained by an extension of the waveforms of FIG. 5. However, such is not believed to be necessary for the present description. The only requirement for the embodiment shown is that the total delay of flip-flop H and the delay of AND-gate 22 not exceed the time between occurrences of the XQ-outputs from the synchronous AND-gate X. Of course, if further stages are connected using steering AND gates such as 22, the total delays of these AND gates must also be considered in determining whether or not the circuit will still operate as described.

If, however, the total delays of the various steering AND gates such as 22 exceed the time between occurrences of outputs from the synchronous AND-gate X, the teachings of this invention may be extended through the use of a further X′ flip-flop similar to the X flip-flop of FIG. 4. The further X′ flip-flop (not shown) would be connected to receive the inputs from various stages as follows: the output of AND-gate 22 instead of being connected directly to stage I would be connected to one J-input of the X′ synchronous AND gate. The outputs of stages C and D would be ANDed through a second AND gate to a second J-input of the X′ synchronous AND gate while the output of stage B would be connected directly to the third J-input of the X′ synchronous AND gate. The X′Q-output of this synchronous AND gate would then be supplied back to the K-inputs and to the I-stage inputs. This X′Q-output would also be used as the steering signal for further stages in the same manner as the XQ-output was used for each of the following stages E, F, and H.

With this last referenced connection, the time between occurrences of the synchronous steering output would be lengthened and thus there could be more total steering time delays in the following circuits before they equaled the time between occurrences of gating outputs from the X′ synchronous AND gate.

It will be obvious to those skilled in the art that the described embodiment of the present invention can be extensively modified such as described immediately above. Further, while J–K flip-flops and other specific components have been described, many other flip-flops and other components may be utilized. I therefore wish to be limited not by the disclosed embodiment but only by the scope of the appended claims.

I claim:

1. Synchronous counting apparatus comprising, in combination:

a first section of multiple AND input J–K flip-flop stages, each stage connected to effectively receive the outputs of all previous stages in said first section;

A second section of multiple AND input J–K flip-flop stages, each stage connected to effectively receive the outputs of all previous stages in said second section;

means for supplying periodically occurring signals to be counted to each stage; and synchronous AND gate means, comprising multiple AND input J–K flip-flop means, connecting said first section to said second section for supplying to the stages of said second section a signal representative of the logical ANDing of the outputs of all stages of said first section, the J-input of said flip-flop of said AND gate means connected for receiving inputs from said first section and the Q-output thereof connected for supplying signals to said second section and to the K-input of said flip-flop.

* * * * *